United States Patent
Benson et al.

[15] 3,672,148
[45] June 27, 1972

[54] SEWN TIRE CORD SPLICE AND METHOD

[72] Inventors: Gustav E. Benson, Edgewood; James M. Pisani, Cumberland, both of R.I.

[73] Assignee: Owens-Corning Fiberglas Corporation

[22] Filed: April 27, 1970

[21] Appl. No.: 31,896

[52] U.S. Cl. .............................. 57/159, 57/142, 112/269, 112/412
[51] Int. Cl. ........................................ B65h 69/06
[58] Field of Search ............. 57/22, 23, 142, 159, 162, 164; 112/2, 121.15, 269, 412

[56] References Cited

UNITED STATES PATENTS

| | | | |
|---|---|---|---|
| 3,155,062 | 11/1964 | Westmijze et al. | 112/412 |
| 2,061,549 | 11/1936 | Chase | 57/159 |
| 2,955,552 | 10/1960 | McGahee | 112/2 |
| 2,971,319 | 2/1961 | Spencer | 57/142 X |
| 3,070,052 | 12/1962 | Freeman | 112/412 X |
| 3,227,116 | 1/1966 | Ferguson et al. | 112/121.15 |
| 3,526,085 | 9/1970 | Illman | 57/142 |

Primary Examiner—Stanley N. Gilreath
Assistant Examiner—Werner H. Schroeder
Attorney—Staelin & Overman and Paul R. Martin

[57] ABSTRACT

A method of splicing glass fiber tire cord ends together which includes the steps of positioning oppositely extending tire cord ends in side-by-side overlapping relationship and sewing an extensible thread around the overlapping ends using a zigzag stitch, the sewing being done in such a manner as to preclude penetration of the overlapping cord ends by the needle, and the sewing tension on the thread causing it to elongate as it is being applied. Excess thread is then trimmed off. Subsequent retraction of the thread after it is locked in position around the overlapping cord ends causes it to form a very tight wrap around the tire cord ends. Also disclosed is the splice or joint made by such method. The splice includes oppositely extending glass fiber tire cord ends in side-by-side overlapping relationship bound together with an extensible thread having been sewn in a zigzag stitch.

4 Claims, 2 Drawing Figures

PATENTED JUN 27 1972 3,672,148

GUSTAV E. BENSON &
JAMES M. PISANI
INVENTORS

BY
*Staelin + Overman*
ATTORNEYS even that shown in FIG. 1.

SEWN TIRE CORD SPLICE AND METHOD

BACKGROUND OF THE INVENTION

This invention relates to a method of splicing glass fiber tire cord ends together to form a structurally strong joint and to the joint made by the method.

Automotive, truck and other type tires are now being made utilizing woven belts of glass fiber cord. Each cord consists of a plurality of individual glass fibers twisted together in a yarn-like manner. Such tires have been found to have significantly greater wearing qualities than conventional rayon or nylon cord tires. The glass fiber cords are conventionally sold to tire manufactures or their suppliers in packages containing metered lengths of cord on spools. The cords are then woven into belts.

In the manufacture and processing of the cords, however, fracture or breaking of the cords is sometimes encountered. The cord ends at the point of fracture must then be spliced in order that packages containing spools of cords of full and uniform length can be produced. Since the cords are processed through a loom and calender in the subsequent weaving operation to produce belts, a spliced joint of sufficient strength and flexibility to be processed therethrough without separation must be produced.

It is an object of this invention to provide a method of splicing glass fiber tire cord ends together to form a structurally strong joint.

It is a further object of this invention to provide a method of splicing glass fiber tire cord ends together utilizing a zigzag stitch sewing machine to produce the splice.

It is a further object of this invention to provide a sewn zigzag stitch overwrap tire cord splice or joint.

Other objects of the invention will be apparent from the description to follow and the accompanying drawings.

DESCRIPTION OF THE PREFERRED EMBODIMENT

Figure 1:
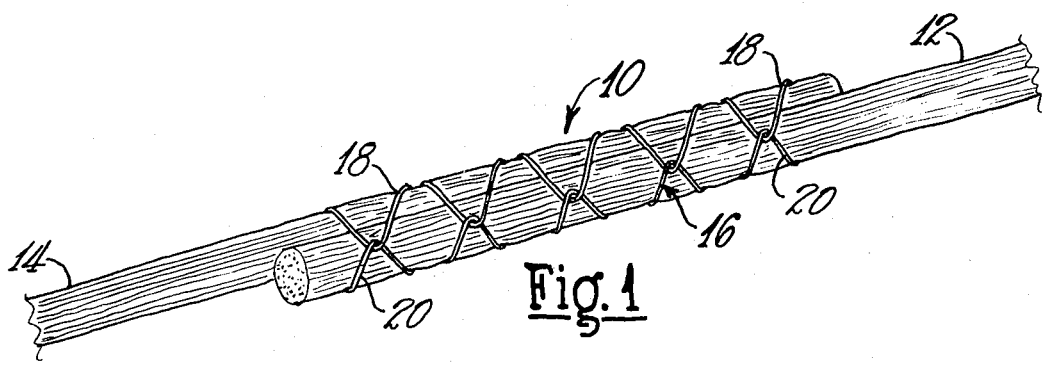
FIG. 1 is a perspective view of one side of the sewn overwrap tire cord splice of this invention.
Figure 2:
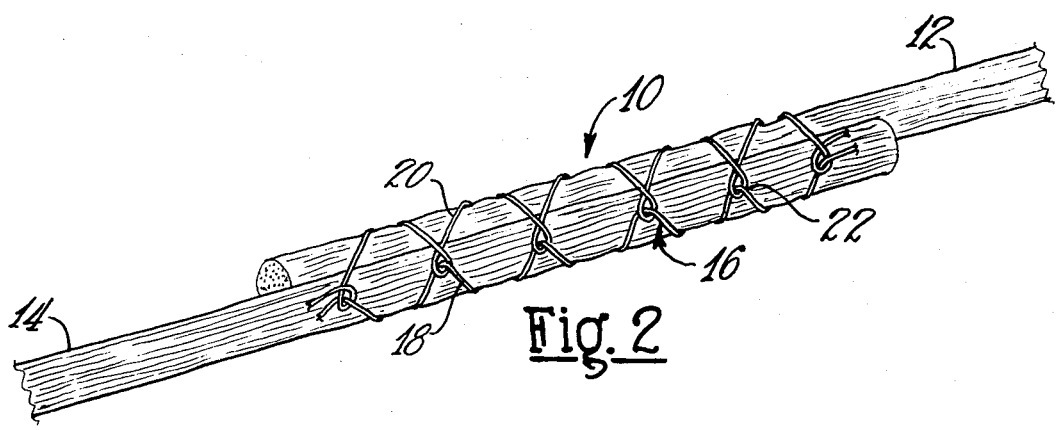
FIG. 2 is a perspective view of the side of the splice of this invention opposite that shown in FIG. 1.

The sewn overwrap tire cord splice 10 of this invention is shown in FIGS. 1 and 2. The splice 10 comprises two tire cord ends 12 and 14 which are in contacting adjacent overlapping relationship to each other. The ends 12 and 14 extend in opposite directions. The ends 12 and 14 are secured together by means of an extensible thread means 16, which is applied in a zigzag stitch with a zigzag sewing machine. The thread means 16 does not penetrate the tire cord ends 12 and 14, but rather is sewn tightly around the tire cord ends 12 and 14, binding them together. The thread used in constructing the splice is extensible, and is preferably a nylon thread having a relatively high elongation property (8—30 percent).

The thread means 16 comprises two elements, a first thread element 18 supplied by the needle of the sewing machine and extending in a zigzag pattern over the top of the two cords 12 and 14, and a second thread element 20 supplied by the bobbin of the sewing machine and extending in a zigzag pattern over the bottom of the two cords 12 and 14.

As best seen in FIG. 1, element 18 loops under element 20 at spaced apart intervals along one side of the cords 12 and 14 while on the opposite side of the cords 12 and 14, as seen in FIG. 2, element 20 is formed into a series of reverse loops 22 at spaced apart intervals, through which element 18 is looped. Thus, the two thread elements 18 and 20 are secured together. The stitching shown in FIGS. 1 and 2 is the conventional zigzag stitch.

The method of this invention comprises positioning at least two oppositely extending glass fiber tire cord ends in overlapping, adjacent, contacting relationship, sewing the two ends together with a zigzag sewing machine utilizing an extensible thread, then severing loose threads. The sewing is done in such a manner as to preclude penetration of the cord ends by the needle. The needle throw or zigzag is set to allow the needle to travel as close as possible to each side of the two ends which lay adjacent each other, but which extend in opposite directions. The cord ends generally have diameters averaging about 0.045 or 0.048 inch.

In a preferred embodiment, the splice is oversewn at each end beyond the limits of the adjacent cord ends, by several stitches. This provides a continuation of the thread onto the single cords, joined by the splice.

While it is preferred that the splice be sewn by starting at one end of the two adjacent cord ends and sewing the length of the splice, it is also possible to start in the middle of the splice, sew to one end, then the entire length of the splice, and back to the middle.

Several factors affect the ultimate properties of the splice 10. It has been found that the sewing thread tension must be kept very high to obtain optimum tensile strength of the splice. The best results are obtained when the tension on the thread supplied by the needle is between 800 and 1,300 grams. The tension on the thread supplied by the bobbin should be the maximum obtainable. It is theorized that the sewing thread tension causes the thread to elongate as it is being applied. Once it is locked around the two ends of the tire cord being spliced, the thread retracts and recovers the stretch imparted by the sewing tensions. When the threads retract, they cause a very tight wrap around the cord ends, thus preventing their separation during subsequent operations.

The tensile strength of the splice also increases with a corresponding increase in splice length. Lengths of at least about 3 inches have been found satisfactory. The preferred length is from 3 to 5 inches.

It has also been found that the number of stitches per inch imparted to the spliced area has an effect on the tensile strength of the splice. As the number of stitches increases, so does the tensile strength. A range of from about 18 to 30 stitches per inch yields an optimum of tensile strength, flexibility of the spliced area, and adhesion of the splice to rubber. The most preferred number of stitches per inch is 24.

The preferred thread for use in the method of this invention to make the splice is nylon sewing thread, of approximately 300 to 420 denier. As hereinbefore stated, the thread must also be extensible, having an elongation property of from 8 to 30 percent.

The sewing tensions on the threads used in forming the zigzag stitch must be sufficient to cause from 8 to 30 percent elongation in the nylon threads.

Loose thread ends must be severed in order that the loose threads will not interfere with a subsequent calendering operation where rubber is applied to the woven belt.

In a preferred embodiment of the invention, the splice bound together with the aforedescribed zigzag stitch has a top dip of a thread compatible latex or other adhesive applied to it. The latex adhesive is conventionally applied with a roller and generally covers all of the spliced area. After the latex has been applied, it is cured by placing the splice in a curing oven. The top dip enhances the splice because it tends to improve adhesion of the splice to rubber and also secures the ends of the sewing thread which have a tendency to unravel. When nylon thread is used to sew the splice, a preferred latex to use in conjunction therewith is a resorcinol-formaldehyde latex. This latex has the following formula.

| Ingredients | | |
|---|---|---|
| Deionized Water | | 32.7 parts |
| Sodium Hydroxide | 50% soln. | 0.06 parts |
| Resorcinol Resin | 75% | 1.1 parts |
| Formaldehyde | 37% | 0.9 parts |
| Ammonium Hydroxide | 28% | 0.9 parts |
| Vinyl Pyridine Latex | 41% | 5.0 parts |

The latex adhesive is made by pouring about 10 parts water in a container, then adding 0.06 part sodium hydroxide thereto, with stirring. The resorcinol resin is then added to the solution and stirred until it dissolves. The formaldehyde is added next to the solution with stirring. Agitation is then stopped and the solution allowed to age for about 1 hour and 45 minutes.

Meanwhile the vinyl pyridine latex is poured into a container. About 22.7 parts of deionized water is placed in a separate container and 0.9 part ammonium hydroxide added with stirring. The ammoniated water is then added to the latex with stirring.

At the end of the resin aging period, the resin solution is added to the latex solution slowly with stirring.

The adhesive prepared in the above manner has a solids content of about 7.8 percent.

Other thread compatible adhesives can be used instead of the latex adhesive described above. By "thread compatible adhesive" is meant one which will not physically or chemically damage the thread when applied to the sewn splice. Suitable thread compatible adhesives give the splice section better compatibility with rubber and promote better processability of the splice.

In still another preferred embodiment of the invention, the nylon thread used in sewing the splice is heat shrunk in situ, i.e., after the splice has been sewn. The heat shrinking binds the two tire cord ends tightly together forming an extremely secure splice. Sufficient heat must be used to cause the thread to shrink. The thread must not have been pre-shrunk prior to use.

The invention will be more clearly understood by reference to the following example.

EXAMPLE I

A tire cord splice was produced in the following manner:

Two glass fiber cord ends, extending in opposite directions, were placed adjacent to each other in overlapping relationship, the overlap being about 5 inches. The diameter of each of the tire cord ends was approximately 0.045 inch. Thereafter the two ends were sewn together using a Pfaff Zigzag sewing machine, Model No. 238–0–6X4.6 equipped with Pfaff needle 134 R–No. 110, an Amco Needle Positioner and Motor, and a foot plate and thread guide assembly (No. 170–108X) manufactured by the Terrell Machine Company, Charlotte, North Carolina. Nylon sewing threads were used. (BST–46 or BST–33 made by Threads, Inc., Gastonia, North Carolina.) The upper thread tension was between 800–1,300 grams and the lower thread tension was the maximum obtainable.

The needle throw or zigzag was set so that the needle traveled as close as possible to the sides of the adjacent cord ends without actual penetration occurring. The splice was sewn for a distance of about 3 inches, 24 stitches to the inch.

The included angle between stitches was about 45°. Excess cord ends and excess threads were trimmed off. A splice having high tensile strength, good flexibility, and the ability to withstand further processing was produced.

EXAMPLE II

A tire cord splice was produced as in Example I. Following this a top coat of resorcinol-formaldehyde latex was applied to the splice with a roller. The latex had the composition as described herein before. The latex was then heat cured on the splice by placing the splice in a curing oven. The temperature of the curing oven was 400° F. and the splice was maintained in the oven for 9 seconds. The top coated splice thus produced had good compatibility with rubber and was more easily processable, in a subsequent weaving operation.

While the preferred sewing machine for use in producing the splice of this invention is the Pfaff Zigzag machine, equipped as indicated in Example I, other zigzag stitch machines can be used, such as Singer or Necchi. It is essential that the throw of the needle be sufficient to travel to both sides of the adjacent cord ends, and that the extent of throw be adjustable.

We claim:
1. A method of splicing glass fiber tire cord ends together which comprises:
   a. placing at least two oppositely extending glass fiber tire cord ends in side-by-side contacting overlapping relationship, b. sewing the tire cord ends together with an extensible thread in a zigzag stitch in a manner to preclude penetration of the cord ends by the needle,
   c. simultaneously while sewing extending the threads by an amount not to exceed the elastic limits thereof, and subsequently contracting the threads in situ to bind the tire cord ends together to form a tightly bound joint, and
   d. severing excess thread.
2. The method of claim 1 which includes the additional step of heating the joint to cause the extensible thread to shrink in place.
3. The method of claim 1 which includes the additional step of applying thread compatible adhesive to the joint and curing the adhesive in situ.
4. The method of claim 3 in which the thread is nylon and the adhesive is a nylon compatible resorcinolformaldehyde latex.

* * * * *